United States Patent [19]

Callahan

[11] Patent Number: 5,408,542
[45] Date of Patent: Apr. 18, 1995

[54] METHOD AND APPARATUS FOR REAL-TIME LOSSLESS COMPRESSION AND DECOMPRESSION OF IMAGE DATA

[75] Inventor: Sean M. Callahan, Cupertino, Calif.

[73] Assignee: Apple Computer, Inc., Cupertino, Calif.

[21] Appl. No.: 881,770

[22] Filed: May 12, 1992

[51] Int. Cl.⁶ ............................................. H04N 7/13
[52] U.S. Cl. .................................... 382/56; 382/17; 358/261.1; 358/433; 348/420
[58] Field of Search .................... 382/56, 17; 358/429, 358/430, 433, 133, 426, 432, 261.3, 261.1; 348/420

[56] References Cited

U.S. PATENT DOCUMENTS

| | | | |
|---|---|---|---|
| 4,319,267 | 3/1982 | Mitsuya et al. | 358/467 |
| 4,558,302 | 12/1985 | Welch. | |
| 4,580,134 | 4/1986 | Campbell et al. | |
| 4,682,215 | 7/1987 | Adachi | 358/261.1 |
| 4,718,090 | 1/1988 | Cooper, Jr. | 358/433 |
| 4,743,959 | 5/1988 | Fredericksen | 358/133 |
| 4,776,028 | 10/1988 | Tanaka et al. | 358/426 |
| 4,922,545 | 5/1990 | Endoh et al. | 382/56 |
| 5,014,327 | 5/1991 | Potter et al. | 382/14 |
| 5,046,119 | 9/1991 | Hoffert et al. | |
| 5,047,853 | 9/1991 | Hoffert et al. | |
| 5,164,819 | 11/1992 | Music | 358/13 |

OTHER PUBLICATIONS

Nelson, "The Data Compression Book", M&T Books, pp. 347–408 (1992).

Primary Examiner—Stephen Chin
Assistant Examiner—Timothy J. May
Attorney, Agent, or Firm—Blakely, Sokoloff, Taylor & Zafman

[57] ABSTRACT

A method and apparatus for lossless compression and decompression of video image data. Video data is composed of the RGB, YUV or gray scale (color) information for each pixel of each frame of the video data. Storage of such video data can require large amounts of data. The present invention provides for lossless compression and decompression of the individual frames of video image data. Each individual frame of video image data is processed in n×n pixel blocks. The combination of colors (called the color list) and the number of different colors in the pixel block is then determined. If the number of colors is above a predetermined threshold, no compression occurs. If the number of colors is below a predetermined threshold, searches for prior occurrences of the combination of colors is than performed. In some instances, a color list for contiguous pixel blocks will be the same. In this instance, a pixel map representing the positioning of the colors in the pixel block is output. Further, each encountered combination of colors is stored as an entry in a color cache. The color cache is subsequently used as a color combination dictionary. In such instances of a pixel block where it's color list is in the color cache, an index to the entry into the color cache is used to represent the colors found in the pixel block. The color cache need not be stored with the compressed data stream since it is reconstructed during decompression of the compressed data stream.

3 Claims, 9 Drawing Sheets

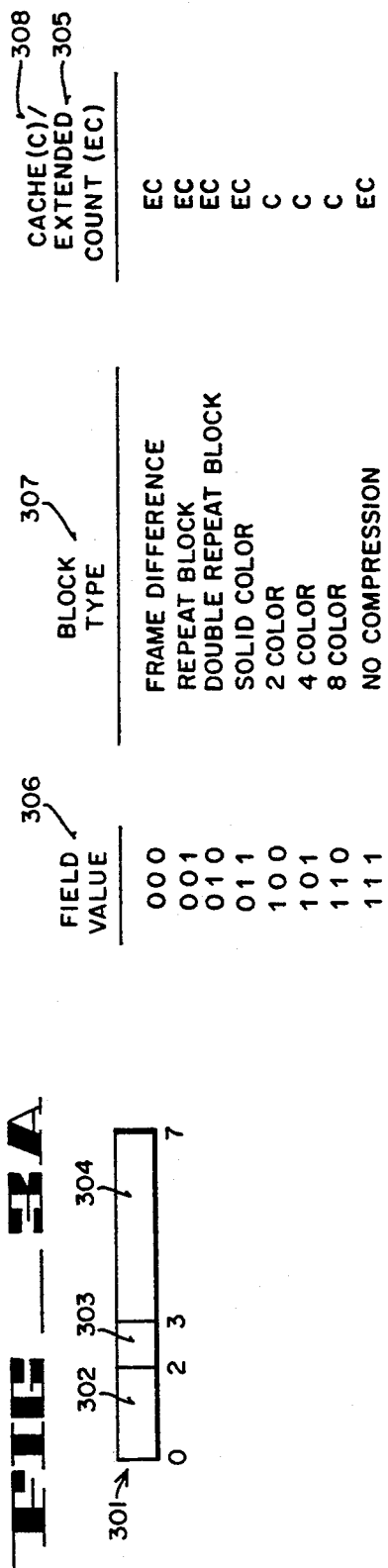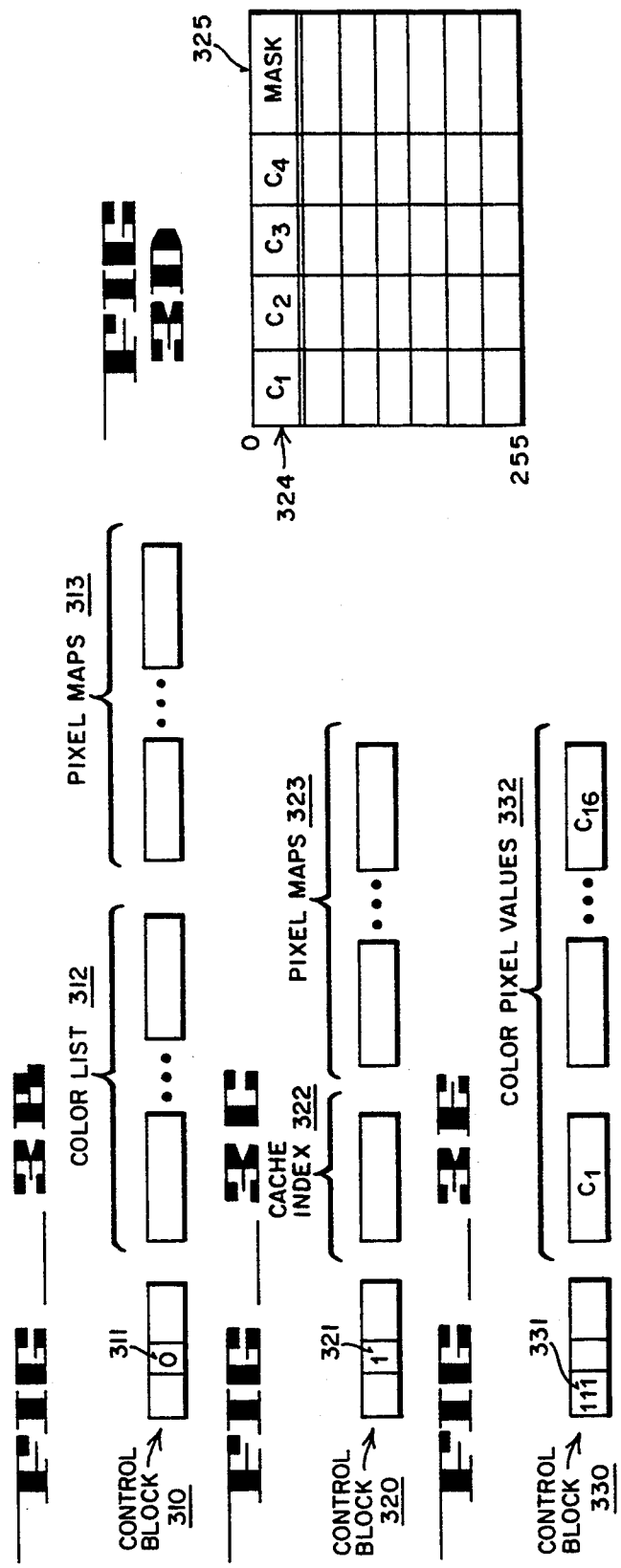

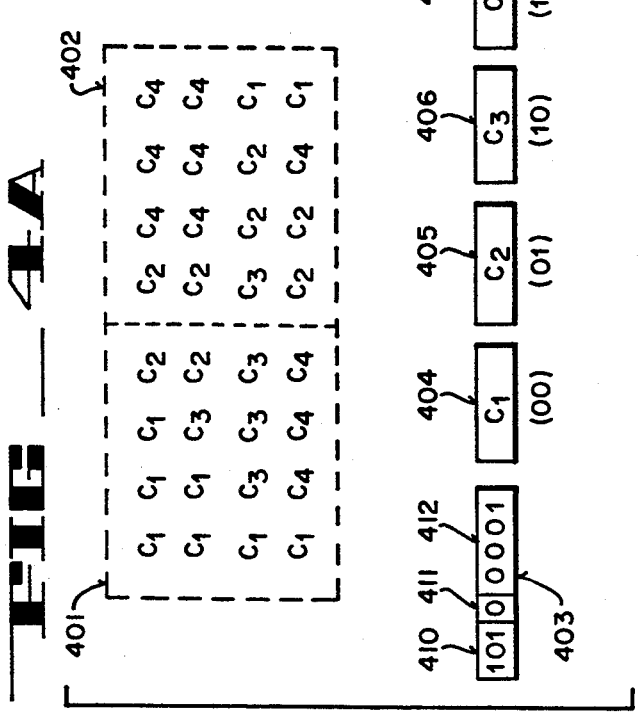
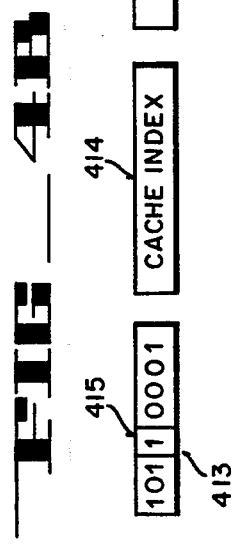
FIG. 4A
FIG. 4B

METHOD AND APPARATUS FOR REAL-TIME LOSSLESS COMPRESSION AND DECOMPRESSION OF IMAGE DATA

BACKGROUND OF THE INVENTION

1. Field of the Invention

The present invention relates to the field of compression and decompression of data, in particular compression and decompression of digital image data.

2. Description of the Related Art

The benefits of compressing data are well-known. Compressing data in some instances saves storage space while in other instances it reduces data transmission time. Numerous techniques are known in the prior art for compressing and decompressing digital video data. For example, see U.S. Pat. No. 5,046,119 entitled "Method and Apparatus For Compressing and Decompressing Color Video Data With an Anti-Aliasing Mode", assigned to the assignee of the present invention. U.S. Pat. No. 5,046,119 describes a digital compression technique that is termed LOSSY. LOSSY data compression techniques concede a certain amount of lost accuracy of the image being represented in exchange for increased compression of the data. LOSSY compression techniques have proven to be effective when applied to graphical or video images and digitized audio data. Such LOSSY techniques operate on the premise that a certain amount of loss of accuracy is acceptable to efficiently represent an image or audio, i.e. analog, source in a digital format. Other LOSSY compression techniques for video image data are discussed by Nelson in "The Data Compression Book", M&T Books, a division of M&T Publishing, Inc., pp. 347–408, (1992).

Other known data compression techniques exactly replicate the original source data on decompression. Such data compression techniques are termed LOSSLESS. For example, see U.S. Pat. No. 4,558,302 entitled "High Speed Data Compression and Decompression Apparatus and Method". In a LOSSLESS data compression method, none of the data is lost during compression. LOSSLESS data compression techniques, are typically used for storing or transmitting textual data. Besides U.S. Pat. No. 4,558,302, known lossless compression techniques include, Huffman coding and various derivatives works on the well-known Lempel-Ziv compression algorithms.

LOSSLESS data compression techniques are generally regarded as unnecessary for video or audio data. Generally, this is due to the distribution of the data representing the video image or audio sound, and the time required for compressing/encoding the data into a compressed data stream.

LOSSLESS data compression for video image signals is desirable for implementations where the amount of data used to represent pixel shading values, is minimized. For example, with 8-bit color graphics, LOSSY compression may result in aliasing effects. Aliasing is the jagged or stair-step appearance of diagonal lines or circles in a video display. LOSSLESS data compression could be used to minimize such aliasing effects.

Thus, it is an object of the present invention to provide a LOSSLESS data compression/decompression technique for storing and retrieving digital image data.

SUMMARY

A method and apparatus for the lossless compression and decompression of a block of color image data is disclosed. The block of color image data is processed in pixel block increments. The method of the present inventions is comprised generally of the steps of: obtaining a pixel block of pixel data from the block of color image data; generating a color list; generating a pixel map of the colors of the pixels of the pixel block; comparing the color list to one or more color lists corresponding to previously processed pixel blocks; determining if the color list matches a color list of a previously processed pixel block; if the color list does match a color list of a previously processed pixel block, encoding the pixel block by creating a reference to the color list of the previously processed subblock and outputting the pixel map; if the color list does not match a color list of a previously processed pixel block, encoding the pixel block by setting a control block type field to a value corresponding to the number of colors in the color list, outputting the control block, the color value data for each color in the color list and the pixel map.

BRIEF DESCRIPTION OF THE DRAWINGS

FIG. 3a is illustrates the control block format for encoding compressed data as may be utilized by the preferred embodiment of the present invention.

FIG. 3b illustrates a control block sequence wherein a color list is in line with the compressed data as may be constructed by the preferred embodiment of the present invention.

FIG. 3c illustrates a control block sequence where a cache index to an entry in a color cache is used lieu of the color list of FIG. 3b, as may be constructed by the preferred embodiment of the present invention.

FIG. 3d illustrates a color cache as may be constructed and utilized by the preferred embodiment of the present invention.

FIG. 3e illustrates a control block sequence where none of the data has been compressed, as may be constructed by the preferred embodiment of the present invention.

FIG. 4a is an example of a 4 color compression, where in the color list is included in the data stream, as may be encoded by the preferred embodiment of the present invention.

FIG. 4b is an example, using the same pixel blocks of FIG. 4a where in the color combination had been previously cached, as may be encoded by the preferred embodiment of the present invention.

DETAILED DESCRIPTION OF THE PREFERRED EMBODIMENT

A method and apparatus for compression and decompression of digital image data on a computer system, is described. In the following description, numerous specific details are set forth such as specific encoding values and structures, in order to provide a thorough understanding of the present invention. It will be apparent, however, to one skilled in the art that the present invention may be practiced without these specific details. In other instances, specific implementation details, such as cache data structures, have not been shown in detail in order not to unnecessarily obscure the present invention. In this description, a bit refers to a single unit of binary information; a byte refers to 8 bits of binary formation, and a word refers to 16 bits (or 2 bytes). Such description and organization of binary data is well known to those skilled in the art.

OVERVIEW OF A COMPUTER SYSTEM IN THE PREFERRED EMBODIMENT

Figure 1A:
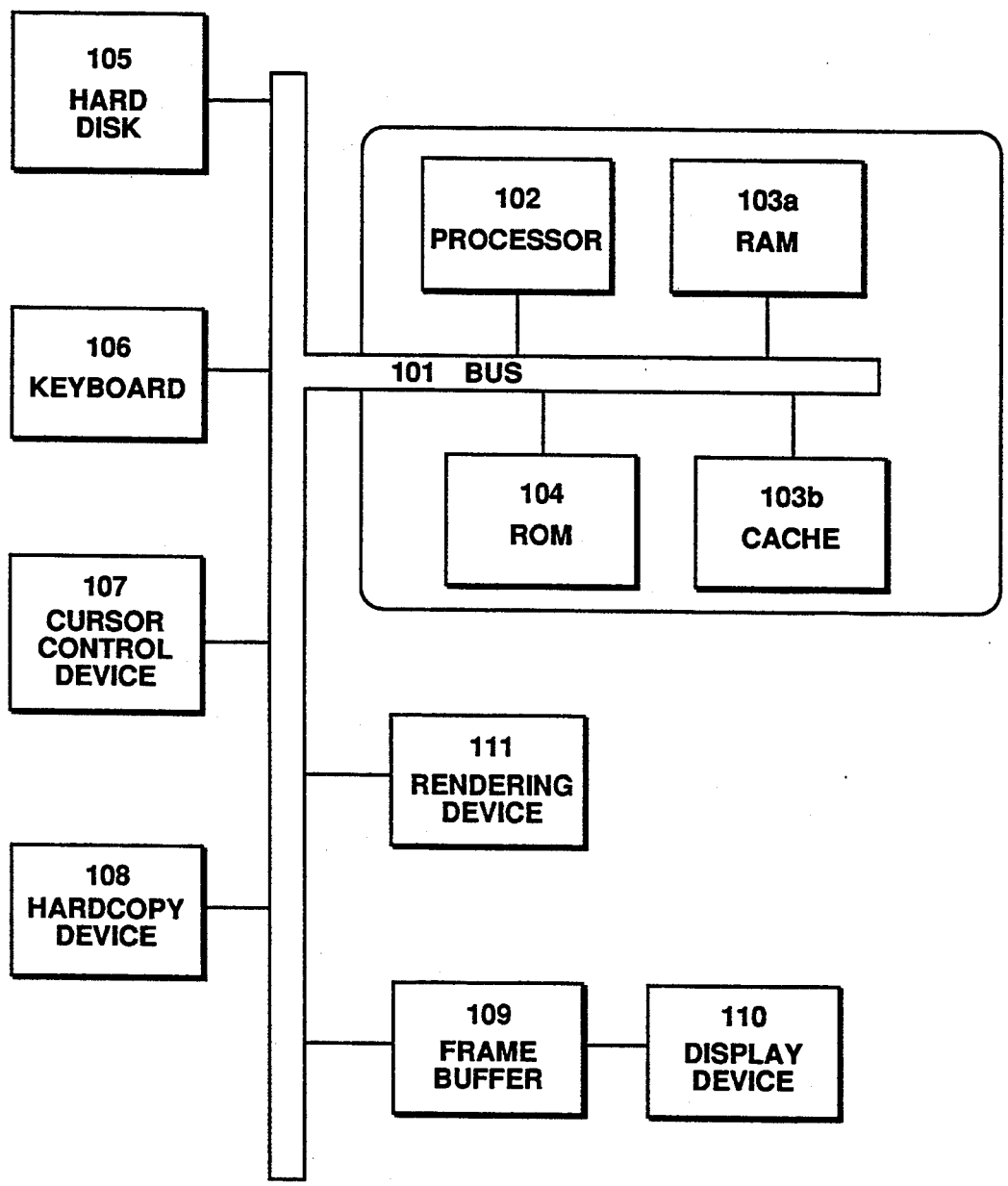
FIG. 1a is a computer system which may embody the currently preferred embodiment of the present invention.

The computer system of the preferred embodiment is described with reference to FIG. 1a. The present invention may be implemented on a general purpose microcomputer, such as one of the members of the Apple® Macintosh® family, one of the members of the IBM Personal Computer family, or one of several work-station, multi-user, or graphics computer devices which are presently commercially available. In any event, a computer system as may be utilized by the preferred embodiment generally comprises a bus or other communication means 101 for communicating information, a processing means 102 coupled with said bus 101 for processing information, a random access memory (RAM) or other storage device 103a (commonly referred to as a main memory) coupled with said bus 101 for storing information and instructions for said processor 102, a cache memory 103b for storing frequently accessed data and/or data that must be quickly accessed, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc, coupled to said bus 101 for communicating information and command selections to said processor 102 and for controlling cursor movement. Additionally, it is useful if the system includes a hardcopy device 108, such as a printer, for providing permanent copies of information. The hardcopy device 108 is coupled with the processor 102 through bus 101.

Also coupled to the computer system of the preferred embodiment is a frame buffer 109 which is further coupled to a display device 110, preferably a display device capable of displaying color graphics images. The frame buffer 109 contains the pixel data for driving the display device 110. In some implementations, the display device 110 may be optionally coupled to a rendering device 111, also known as a graphics accelerator. Typically, such a rendering device 111 is coupled to the bus 101 for communication with the processor 102 and frame buffer 109. The preferred embodiment is implemented for use on a Macintosh computer available from Apple Computer, Inc. of Cupertino, Calif.

It should be noted that the processor 102 performs various parts of the compression/decompression, such as extracting pixel shading values and generating control blocks. Further, such compressed data may be stored in the data storage device 105.

Figure 1B:
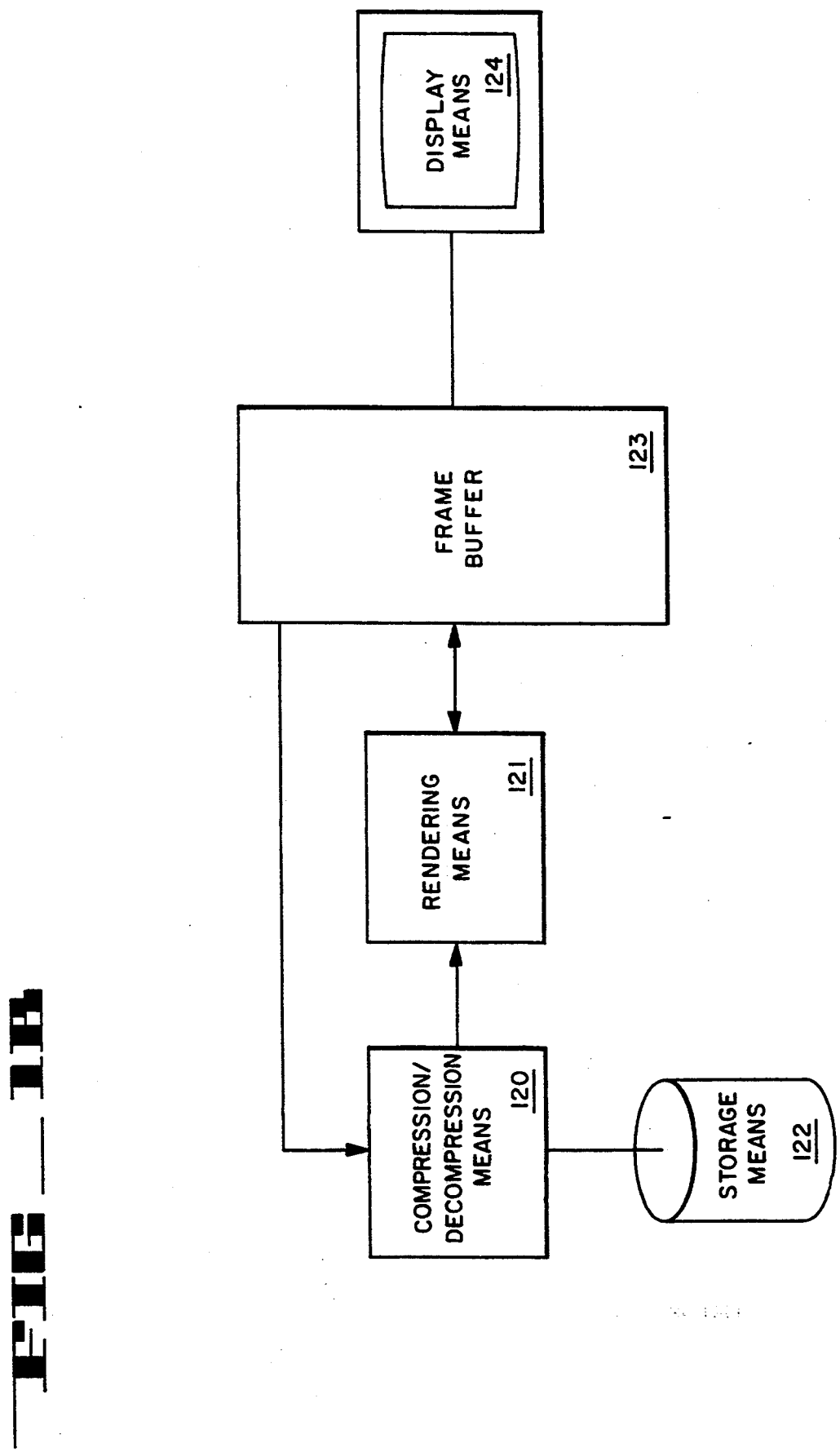
FIG. 1b is a functional diagram indicating the relationship between compression/decompression means of the preferred embodiment with respect to other components in a computer system.

Referring now to FIG. 1b, the relationship between the present invention and the computer system is described in more detail. Compression/decompression means 120 is coupled to rendering means 121. The rendering means 121 is used to generate pixel shading values. In some instances, the rendering means will retrieve pixel shading data from storage means 122 after it has been decorepressed by compression/decompression means 120. The rendering means 121 is further coupled to the frame buffer 123. The frame buffer 123 contains the digital data information which is used to shade pixels on display means 124. Further, the frame buffer 123 is coupled to the compression/decompression means 120. For example, when an image display is to be stored, the contents of frame buffer 123 are transferred to the compression/decompression means 120 for compression. After compressing, the data is stored in storage means 122.

Overview of the Method of the Present Invention

The currently preferred embodiment of the present invention operates on 8-bit pixel shading values. However, it would be apparent to one skilled in the art that the present invention is extensible to pixel shading values having longer or shorter bit lengths. These 8-bit pixel shading values may represent either gray scales, color values, or it may be an index to a color or gray scale table. For example, it can be the 8 bits represents RGB color data, 3 bits are used to represent red data, 3 bits are used to represent green data, and 2 bits are used to represent blue data. However, the method of the present invention would operate equally with other color data organization or schemes (e.g. YUV). The method of the preferred embodiment group pixels into blocks. In the currently preferred embodiment, these blocks are 4×4 square blocks of pixels in the frame buffer. Although a sequential stream of pixel values can be used, it has been found that by utilizing 4×4 blocks of pixels, greater compression can be achieved. The 4×4 blocks are created, for example, by taking the first four pixel shading values of a first scanline, the first four pixel shading value of a second scanline, the first four pixel shading values of a third scanline, and the first four pixel shading values of a fourth scanline. Grouping pixels in this manner is described in U.S. Pat. No. 5,046,119 which was referenced with respect to the prior art.

In the foregoing description, the term "color" or "colors" will be used to denote pixel shading values (which, as described above, may be either color data, gray scale data, or indexes to a pixel shading table). In any event, the pixel blocks are encoded by first determining the number of colors of pixels within the block. Compression/encoding of the pixel block occurs responsive to the results of encoding prior pixel blocks. The compressed/encoded stream of data will be comprised of control blocks and in some instances followed by either a list of colors or an index to an entry in a color cache, followed by one or more pixel maps. In other instances, a control block will indicate that the pixel block is to be ignored or that prior decompressed pixel blocks should be directly copied. Compression will only occur for pixel blocks with 8 or fewer colors. An exception may occur if a pixel block is identical to an immediately prior pixel block.

Figure 2A:
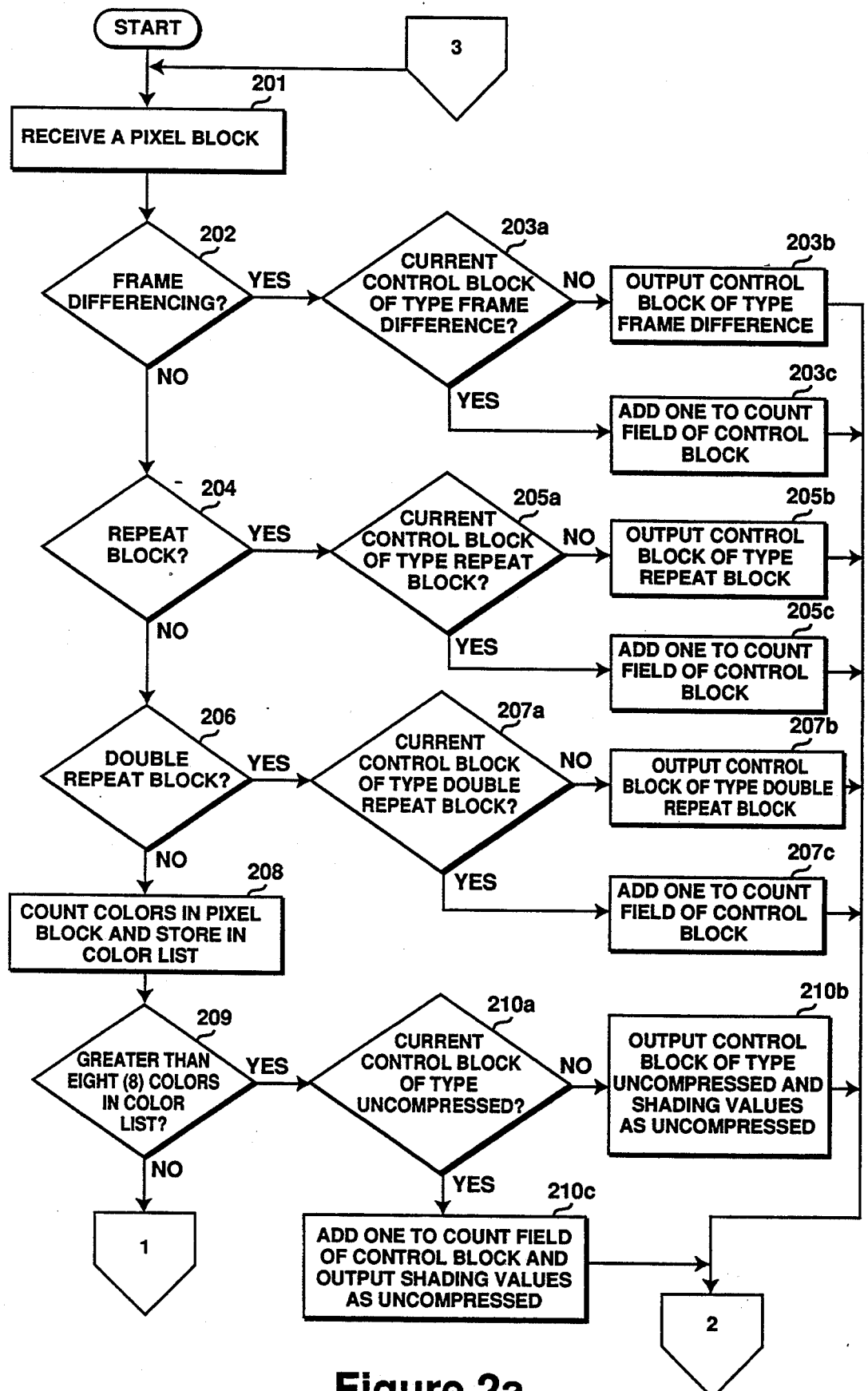
FIGS. 2a–2b are flow charts which illustrate the general method for compression as maybe utilized by the preferred embodiment of the present invention.

The general method of compression/encoding is described with reference to FIGS. 2a and 2b. Referring to FIG. 2a, first a pixel block is received, step 201. As noted above the pixel block will be a 4×4 pixel block. Next, it is determined whether the image being compressed is subject to frame differencing, step 202. Frame differencing refers to an image storage technique typically used for animation or video where only the different pixels from one image frame to a subsequent image frame, are stored. If frame differencing is enabled, then the current control block is checked to determine if it is a frame differencing control block, step 203a. If not, a new control block of type frame difference is output, step 203b. If yes, a count field in the circuit control block is incremented by one, step 203c. In either case, a check is made for the last pixel block, step 224.

If frame differencing is not enabled or did not succeed, a repeat block is checked for, step 204. A repeat block is one where the immediately prior pixel block is identical to the pixel block just received for processing. If such a repeat block is encountered, a current control block is checked to determine if it is of type Repeat Block, step 205a. If no, a new control block of type Repeat Block is output, step 205b. If yes, a count field in the current control block is incremented by one, step 205c. In either case, a check is made for the last pixel block, per step 224.

If a repeat block is not found, a check is made for a double repeat block, step 206. In checking for a double repeat block the second most immediately processed pixel block is compared with a current pixel block and the immediately prior pixel block is compared with a subsequent pixel block. If the double blocks are identical, a current control block is checked to determine if it is of type Double Repeat Block, step 207a. If no, a new control block of type Double Repeat Block is output, step 207b. If yes, a count field in the current control block is incremented by one, step 207c. In either case, check for the last pixel block is made per step 224.

If none of the above conditions exist, the colors in the pixel block are counted and stored in a colors list, step 208. It has been determined that if greater than 8 colors exists for a particular pixel block, the data should be stored as uncompressed. Thus, a check is made to determine if there are greater than 8 colors in the pixel block, step 209. If there are greater than eight colors, a current control block is checked to determine if it is of type uncompressed, step 210a. If no, a new control block of type uncompressed is output along with pixel color values, step 210b. If yes, a count field in the current control block is incremented by one and the pixel color values are output, step 210c. A check for the last pixel block is again made, per step 224.

Figure 2B:
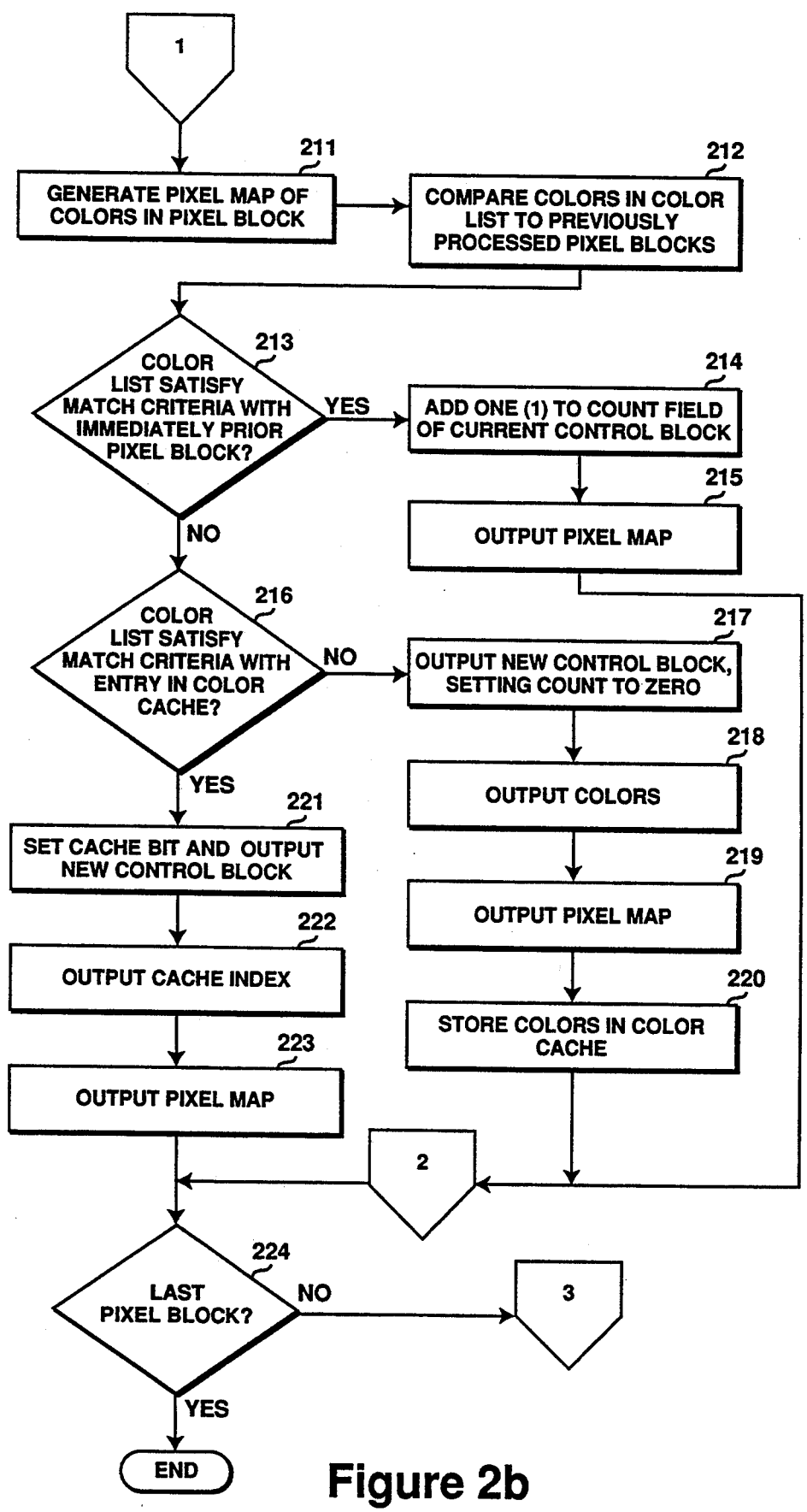

Referring now to FIG. 2b, if there are 8 or fewer colors in the color list, a pixel map of the colors is created, step 211. A pixel map is used to identify the colors of the respective pixels in a pixel block. The colors in the color list are then compared to the colors in previously processed pixel blocks, step 212. First, a check is made to see if the color list satisfies match criteria with the immediately prior pixel block step 213. If the color list satisfies the match criteria, then encoding and compression occurs by incrementing a count field of the current control block by 1, step 214 and outputting the pixel map for the pixel block, step 215. The check is then made for the last pixel block per step 224. If the color list does not satisfy match criteria with the immediately prior pixel block then a color cache is checked, step 216. The color cache will contain entries which have different combinations of colors that have been encountered in prior pixel blocks. Descriptions of the contents of a color cache and how searching a color cache is performed is provided below. If the color list does not satisfy match criteria with an entry in a color cache, a new output control block is output where the count field is set to zero step 217. Note that a count field set to zero reflects that it is associated with the current pixel block. The colors in the color list are then output, step 218. Then the pixel map is output step 219 and the colors are stored as an entry in the color cache, step 220. The steps 217 and 220 represent a case where the combination of colors in the pixel block have not been previously encountered.

If the colors in the color list satisfy a match criteria with the colors in an entry in the color cache, then a new control block is output with a cache bit set, step 221. Setting the cache bit will signal that the colors for the pixel block may be found in the color cache. Next, a cache index pointing to the entry in the color cache which has the combination of colors for that pixel block is output, step 222. Note that this cache index is comprised of significantly fewer bits of data then the number needed to represent all the colors in the pixel block. The pixel map for the pixel block is then output, step 223. Finally a check is made for the last pixel block step 224. If it is not the last pixel block, a new pixel block is received per step 201. If it is the last data pixel block, then the encoding/compression is completed.

The term "match criteria," as used in the foregoing description, refers to predetermine criteria so that a color list or color cache entry contains colors which may be referenced by subsequent pixel blocks. Such match criteria include instances where: 1) the number of colors in the color list is less than the number of matching colors in the pixel block being processed; 2) the colors in the color list are identical; and 3) instances where the color list or color code entry contains "invalid" or unused colors. Such instances are described in more detail below.

Description of Control Blocks and Control Block Sequences

FIG. 3a illustrates the format of and the information contained in a control block. Referring to FIG. 3a, a control block 301 is comprised of a block type field 302, having 3 bits of block type information, a one bit cache/extended count (flag) field 303, which is a flag to indicate what data will be following the control block 301; namely, a cache index, list of colors or an extended count byte. Finally, the control block 301 includes a count field 304, which indicates the number of processed pixel blocks associated with the control block. The count field 304 is 4 bits wide; thus, the entire control block is one byte (8 bits) wide. Further illustrated in FIG. 3a is table 305. Table 305 describes the encoding within a control block. The column Field Value 306 of Table 305 describes the encoding of the block type field 302. The column Block Type 307 describes the block type. Finally, column flag 308 describes how flag field 303 is used for the respective block types.

As indicated, there are 8 different types of control blocks that may be generated. In the solid color ( i.e. 1 color) case, the block type field will have a value of 011. Further, no pixel map need be generated, because all the pixel values will be the same. Further, only a single color need be provided as output. In the solid color case, the flag field 303 will indicate that the byte following the control block will be an extended count byte.

In the 2 color case, the field value will be 100 and the flag field 303 will indicate whether the color information for the pixel block will follow the control block (in a color list), or will be contained in a color cache. In the latter instance, what will follow the control block is a cache index. The 4 and 8 color cases are similar to the 2 color case. The fundamental difference being the number of colors under consideration. In the 4 color case, the field value is 010, while in the 8 color case, the field value is 110. A pixel map in a 2 color case will require only 16 bits. This is because a single bit can be used to distinguish between the 2 colors. Similarly, in the 4 color case, 2 bits are used to distinguish between the 4 colors, for a total of 32 bits in the pixel map. Finally, in the 8 color case, 3 bits are used to distinguish between the 8 colors, for a total of 48 bits in the pixel map.

In the organization of the preferred embodiment, storage is addressable in 16 bit words. In the 2 color and 4 color cases, the pixel maps correspond directly to this organization, thus avoiding any unused storage. The 8 color case does not map directly to the storage organization. In the 8 color case, 3 words are used. The first 12 bits of each word are used to store the pixel data for the first 3 rows of the 4×4 pixel block. The remaining 4 bits in each word are used to store the pixel data for the remaining row in the pixel block.

Referring back to the different types of control blocks, when a pixel block contains greater than 8 colors, no compression occurs. Here, a block type field value of 111 will indicate that the pixel block has not been compressed. In this case, no pixel map will be generated for the pixel block.

Finally, the repeat block (field value 001), double repeat block (field value 010), and frame difference (field value 000) control block field encoding values are illustrated. The repeat block and double repeat blocks allow for the greatest degree of compression, in that color information or pixel maps are not generated.

FIG. 3b illustrates a control blocks sequence where the combination of colors in the color list has not been previously encountered for the 2, 4 and 8 color cases. Within a control block 310 is a flag field 311. The flag field 311 is set to 0. This indicates that what follows the control block 310 is a list of colors, here colors 312. The number of colors 312 will depend on the number of colors in the color list. As noted above this could be anywhere from 1 to 8. Finally, following the colors are pixel maps 313. These pixel maps 313 are used to identify which of the colors in the color list 312 that each of the pixels in each of the pixel maps correspond to. Finally, in the 2, 4 or 8 color cases, the count field for the control block 310 is limited to four bits; if so, a maximum of 16 pixel maps may follow.

Although not illustrated, for the control block types (i.e. frame difference, solid color, repeat frame and double repeat frame) that allow for extended count bytes following the control block, up to 4098 pixel blocks may be referred to by the control blocks.

Encoding for 3, 5, 6, 7 Colors

At this point it is useful to discuss the encoding that occurs when there is an odd number of colors: namely, 3 color case, the 5 color case, the 6 color case and the 7 color case. In the case where the odd number of colors is less than the number of colors in a color list or color cache entry, reference can be made because the pixel map will dictate use of color. Moreover, in the case where the color list, or cache entry, is encoded with fewer colors than the pixel block being processed, the prior color data may still be used.

As the processing is the same for each of the cases, the 3 color case will be used as an example. In the 3 color case, a 4 color control bock is used (in the other cases an 8 color control block is used). In this case, only 3 colors in the colors list 312 are valid (i.e. used). A fourth invalid (i.e. unused) color is also included for consistency in the compression/decompression process. Note that the pixel map generated would not refer to this fourth invalid color. However, if a subsequent 4 color pixel block occurs with these 3 colors, and a fourth different color, the color list color data can be modified to reflect the fourth color. If the pixel block is being added to the existing control block, the new color can simply replace the fourth unused color in the color list. This may occur when the pixel blocks are adjacent. If it is an instance where the three colors have been inserted into a color cache, the fourth color is simply added to the color cache. Again, this is made possible because the pixel map in the 3 color case will not refer to the fourth (new) color.

FIG. 3c illustrates a control block sequence where the color list has been previously encountered and has been stored in the color cache. First, the control block 320 will have a flag field 321 which has been set, i.e. to a 1 value. This indicates that following the control block 320 will be a cache index 322. The cache index 322 indicates a location or entry in a cache where the combination of colors can be found. FIG. 3d illustrates such a color cache for the 4 color case. A separate color cache will exist for 2, 4 or 8 color cases. Like all the color caches, the 4 color cache 324 contains 256 entries. This corresponds to the length of the 1 byte cache index. In the four color case, either 3 or 4 colors are stored in each cache entry. The cache further contains a pixel mask field 325. As will be described in more detail below, the pixel mask field 325 provides for performance improvement when searching the cache. Thus, a 4 color cache index will have entries that are 64 bits wide, each color comprising of 8 bits and the 32 bit mask fields. The cache index 322 in FIG. 3c will correspond to one of the entries in the color cache. As noted above, the count field is 4 bits. Thus, only 16 pixel maps 323 may follow the cache index 322.

Referring now to FIG. 3e, the control block sequence where no compression occurs is illustrated. First, the block type field has the value 111. Following the control block will be color pixel values 323. These are the 16 colors corresponding to each of the sixteen pixels in the pixel block. The colors are provided in the order in which they appear in the pixel block.

Compression Example

FIG. 4a and 4b illustrate compression/encoding in the 4 color case. Referring to FIG. 4a, pixel blocks 401 and 402 are illustrated. Control block 410 is the control block that would be encoded for the pixel blocks 401 and 402. First the type field 403 for the control block will have a value 101. This can be verified by referring to FIG. 3a and seeing that the field value 101 refers to the 4 color case. Note that since that this is the first instance of this combination of colors, flag field 411 is set to zero (i.e., not set). Finally, the count field 412 is set to 0001 to indicate that there are 2 pixel blocks. Further indicated are colors 404-407. Each of these 404-407 represent the colors that were found in each of the pixel blocks 401 and 402. The sequence of the colors 404—404 are presented in the order in which they are encountered when scanning the pixel block from left to right and top to bottom. Further, each of the colors 404-407 have a value assigned to it which are used by the respective pixel maps 408 and 409 to identify a particular shading value for a corresponding pixel.

In this example if stored as uncompressed data, 8×32 or 256 bits of data would be required to describe the shading values for each of the pixels in the 2 pixel blocks. Using the compression method of the preferred embodiment only 104 bits are required for the 2 pixel blocks. This results in a 2.5 to 1 compression ratio. Note as the number of pixel maps increase, the compression ratio will increase accordingly.

FIG. 4b illustrates a control block sequence of the pixel blocks 401 and 402 of FIG. 4a, except that the combination of color has been found in a cache. Here, the control block 413 will only differ in that the flag 415 is set. This will indicate that following the control block 413 will be a cache index 414. As noted above the cache index will be a one byte index into a 4 color cache. Following the cache index will be pixel maps 408 and 409.

In this instance, only 80 bits are requested to represent pixel blocks 401 and 402. This results in a compression ratio of greater than 4 to 1.

Color Cache Searching

Searching a dynamically created color cache for particular combinations of colors is an intensive process. As there are 256 possible colors for an 8-bit pixel value, direct comparison of colors in a color list and the colors in the cache entries can be quite time consuming. In the 2 color case it has been determined that a direct comparison of colors is most efficient. In the 4 and 8 color cases, the task of searching a cache has been greatly enhanced through the use of color masks, namely a pixel block mask and a cache entry mask. The pixel block mask identifies color ranges in which the pixels in the pixel map lie. Likewise, the cache entry mask identifies the color ranges in which the colors in the cache entry lie. By comparison of the two masks, the number of cache entries which are examined to find matches is greatly reduced.

In the currently preferred embodiment, the 256 possible colors are divided into 32 ranges of 8 colors. Each of the 32 color ranges correspond directly to a single bit of a 32 bit color mask. So any particular color will cause the bit of the color mask corresponding to the color range in which the particular color lies, to be set. This is how the pixel block mask is created. Conversely, the cache entry mask is the result of inverting the values of the mask, after the color ranges and corresponding bits in the mask are set. The reason for this is to quickly identify a minimum number of colors in the color list of the pixel block, that are not in the cache entry. This aids in quickly identifying cache entries where there is no match.

The identification is illustrated by the following example. Using for simplicity and illustration a hypothetical 4-bit mask, suppose that the pixel block mask has a value of 1100 and the cache entry mask is 1010 (non inverted this would be 0101). From a quick visual inspection of the pixel block mask and the non inverted cache entry mask, it is shown that there is a potential color match at the second bit position (when viewed from left to right). Further, it can be seen that there is no match for one of the colors in the pixel block by the 1 value in the first bit position of the pixel mask and a 0 value in the first bit position of the cache entry mask. Thus, there is at least one color in the pixel block color list that is not in the cache entry.

The fact that one color is not in the cache entry is quickly determined by performing a logical AND function between the cache entry mask and pixel block mask Here the ANDing of the two masks (i.e. 1100 AND 1010) results in the value 1000. By counting the number of set bits, i.e. ones, in the result, a minimum number of colors not in the cache entry is quickly determined. Here, that value is 1.

The pixel block mask is created when a color cache is to be searched. As described above, the cache entry mask is stored as part of the color cache entry and is created when the color data is inserted in the cache.

Once an entry in the color cache is identified as a potential match, the colors in the entry are directly compared with the colors in the pixel block color list.

Figure 5A:
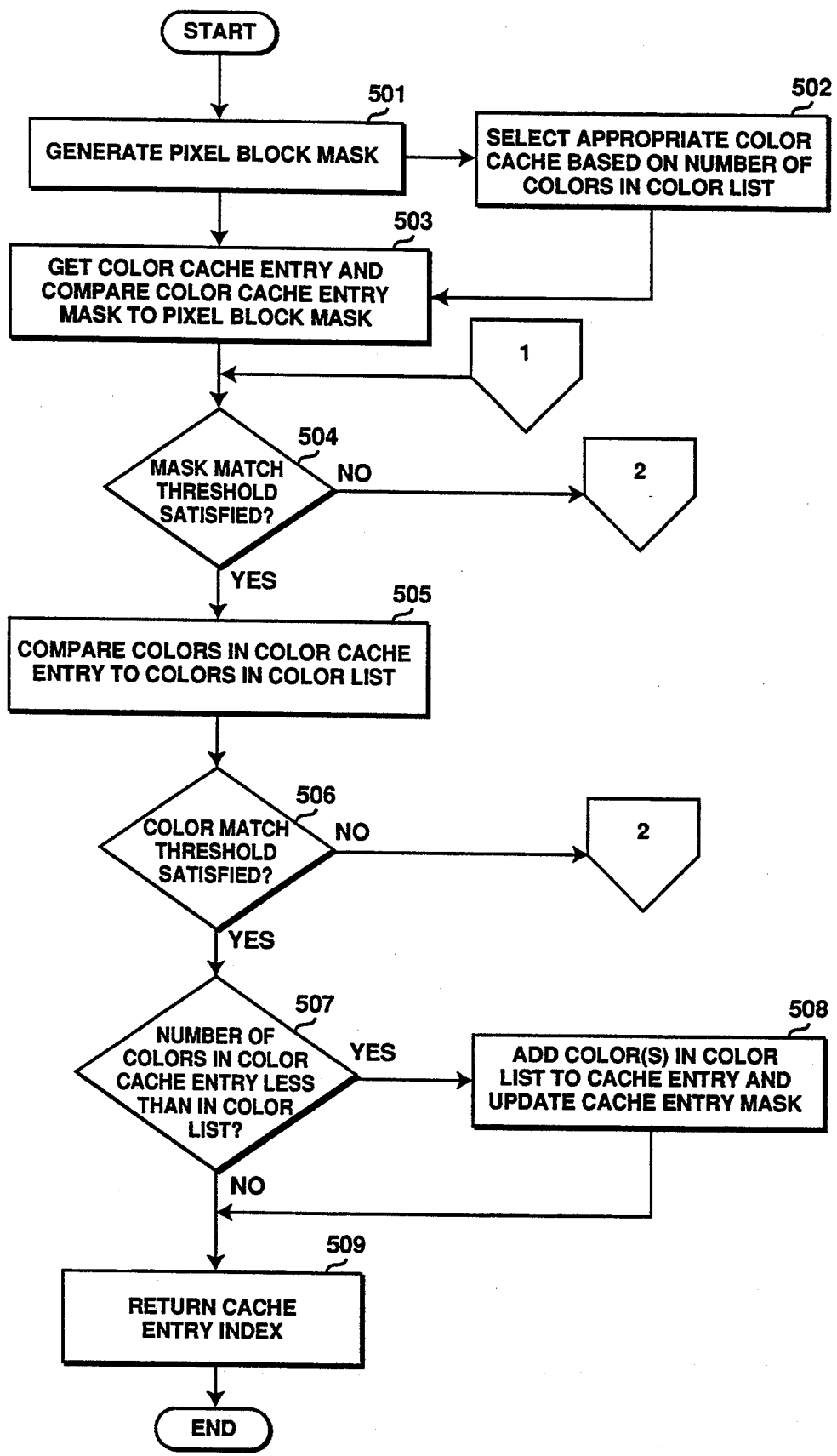
FIGS. 5a–5b are flowcharts which describe the steps for color cache searching in the four color and eight color cases, as may be performed by the preferred embodiment of the present invention.
Figure 5B:
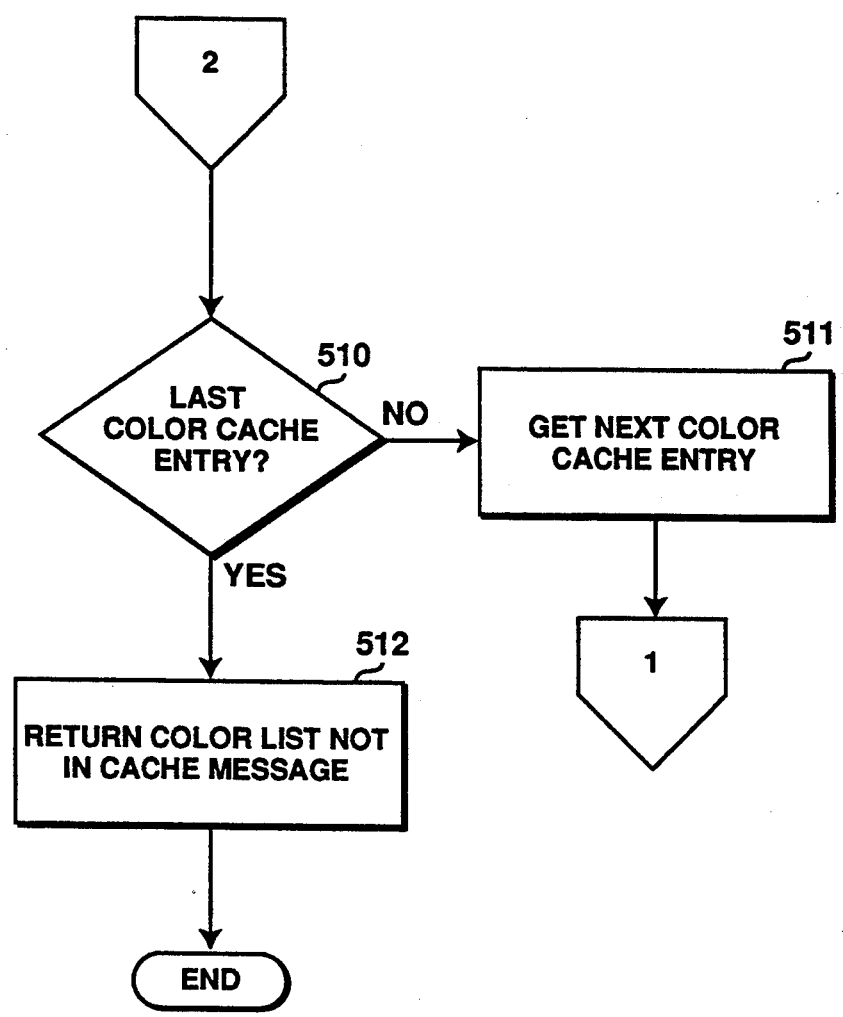

FIG. 5a is a flowchart that illustrates in greater detail, the flow for cache searching in the 4 and 8 color cases as performed in the currently preferred embodiment. First, a pixel block mask for the pixel block being processed is generated, step 501. The pixel block mask is generated using the approach described above. Next, the appropriate color cache to be search is selected, step 502. The appropriate color cache will correspond to the number of colors in the pixel block color list. For the 4 color cache, there will be 3 or 4 colors in the color list. For the 8 color cache, there will be 5–8 colors in the color list. Once the appropriate cache has been selected, the process by which the cache entries are screened is performed. First, a color cache entry is retrieved and the cache entry mask is compared to the pixel block mask, step 503.

It is then determined if the result of the mask match is greater than a predetermined match threshold, step 504. For the 4 color case, a mask match threshold is that there be at least 3 color range matches. For the 8 color case, the mask match threshold is 5 color range matches. As will be explained below, this threshold corresponds to the fact that there may be entries in the color cache that use less than the maximum of possible colors (e.g. only 5 colors in an 8 color cache). In any event, if the mask threshold is not satisfied, a check for the last color cache entry is made per step 510 (described below).

If the mask match threshold is satisfied, the colors in the color cache entry are compared to the colors in the pixel block color list, step 505. A test to determine if a color match threshold is reached is made, step 506. The color match threshold is identical in purpose and implementation to the mask match threshold, except that exact colors, rather than color ranges, are compared. The color match threshold for the 4 color case is that there must be 3 identical matches. For the 8 color case, the color match threshold is that there are 5 identical color matches. If the color match threshold is not satisfied, the processing for the cache entry is completed and a test for the final cache entry per step 510. If the cache entry examined is not the last entry, a next cache entry is retrieved, step 511 and processing returns at step 504.

If the color match threshold is satisfied, a cache match has been found. However, further processing is required to determine if there are empty unused entries in the cache entry that may be used by the pixel block color list. Accordingly, a check is made to determine if the number of colors in the color cache entry is less than the number of colors in the pixel block color list, step 507. If no, the cache entry index is returned for outputting into the compressed data stream, step 508. If yes, it is known that there are unused colors in the pixel hock color list. In this instance, additional colors are added to color cache entry, step 508. This will also cause the creation of a new cache entry mask being generated and stored. Once this is completed the cache entry index is returned for outputting into the compressed data stream per step 508.

In the currently preferred embodiment, a circular cache structure is used. Thus, when the cache is full, i.e. contains 256 entries, the next cache insertion request will cause the first entry to be overwritten. Subsequent cache insertion requests will cause the next sequential cache entries to be overwritten. Further, as a cache entry mask is only used during compression, it is not needed during decompression of the compressed data stream. Thus, during the building of a color cache during decompression, the cache entry mask is not generated.

DECOMPRESSION

Figure 6:
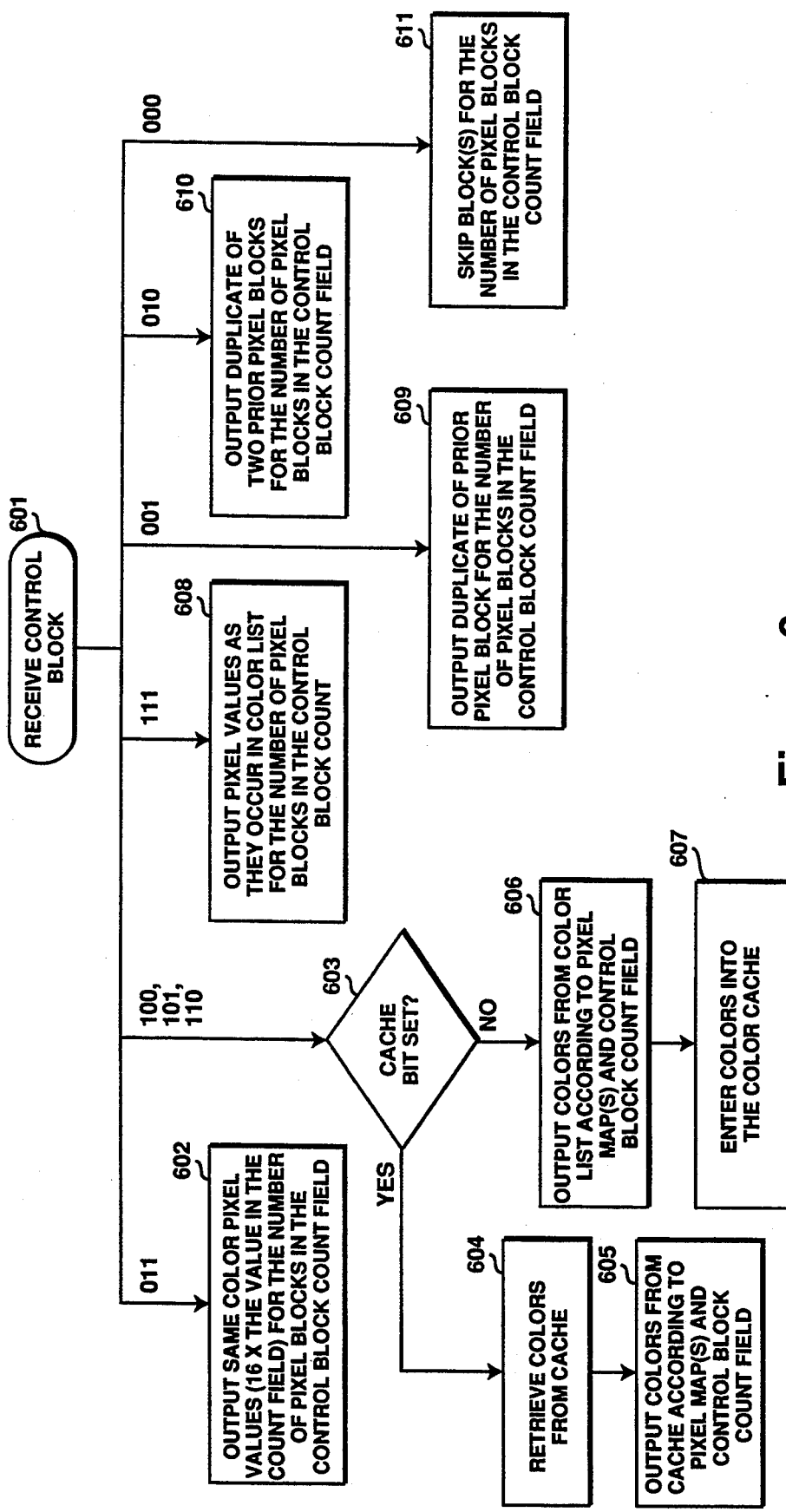
FIG. 6 is a flow chart illustrating the decompression/decoding method, as may be utilized by the preferred embodiment of the present invention.

FIG. 6 is a method for decompressing or decoding a data stream which has been compressed/encoded using the method of the preferred embodiment. First, a control block is received, step 601. The block type field of the control block examined. If the block type field contains the value 011, it is a solid color type block. In this instance the same color pixel value is output, step 602. This occurs for 16, i.e. the number of pixels in the pixel block, times the value in the count field of the control block. Note that for each of the pixel blocks the pixel values will be placed 4 pixels per scan line.

If the block type field contains the value 100, 101, 110, then it is a type where colors are compressed, potentially using a color cache. In each instance the decompression means will recognize the block type and recognize the number of colors being processed and the appropriate cache to be accessed. First, a check is made to see if the cache bit is set, step 603. If the cache bit is set, then the colors are retrieved from the color cache using the cache index following the control block in the compressed data stream step 604. The colors from the cache are then stored and output according to the one or more pixel maps associated with the control block, step 605. Alternatively, if the cache bit is not set, it is known that this is a new combination of colors. In this instance, it is known that the list of colors will be following the control block in the compressed data stream. The colors are then output in a sequence in accordance with the one or more pixel maps associated with the control block, step 606. Next, the colors from the color list are entered into the color cache, step 607. Note that the index to the color cache here will correspond correctly because the data is being decoded in the same order in which it was encoded. This is because the color caches are created dynamically during both compression and decompression, and the compressed data stream is processed in the same order as the original pixel data.

If the block type field contains the value 111 there is no compression, step 608. In this instance the pixel values are output as they occur in the color list following the control block, for the number of pixel blocks specified in the count field of the control block.

If the block type field has values 001 or 010, then the prior pixel block or the 2 prior pixel blocks, respectively are duplicated and output for the number of pixel blocks specified in the count field of the control block. Finally, if the block type value is 000, the number of blocks specified in the count field of the control block are skipped because frame differencing is enabled.

Thus, a method and apparatus for LOSSLESS compression and decompression of video image data, is disclosed.

I claim:

1. A method for compressing a block of color image data to create a compressed data stream comprised of encoded control blocks and color value data, said method comprising the steps of:

A) generating a control block having a type field, a count field and a flag field, said control block being associated with a particular color list;
   B) obtaining a current pixel block from said block of color image data, said current pixel block including a plurality of pixels having a plurality of colors;
   C) generating a current color list corresponding to said current pixel block, said current color list identifying said plurality of colors;
   D) generating a current pixel map, said current pixel map indicating a correspondence between said plurality of pixels and said plurality of colors;
   E) providing a plurality of color caches for storing a plurality of color lists, wherein said plurality of color lists are stored in said plurality of color caches based upon the number of colors represented in each of said plurality of color lists;
   F) comparing said current color list to said particular color list associated with said control block to determine a match; and
   G) if said current color list matches said particular color list associated with said current color block, then
      G1) incrementing the count field of said current block; and
      G2) outputting as part of said compressed data stream said current pixel map;
   H) if said current color list does not match said particular color list associated with said control block, then
      H1) identifying a selected color cache of said plurality of color caches, the selected color cache being a color cache that stores color lists that represent the same number of colors as are represented in said current color list;
      H2) comparing said current color list to one or more color lists from said selected color cache to determine if said current color list matches a color list of said one or more color lists stored in said selected color cache;
      H3) if said current color list matches said color list of said one or more color lists stored in said selected color cache, then encoding said current pixel block by H3a) generating a new control block, said new control block having a flag field and a type field;

H3b) creating a reference to said color list of said one or more color lists stored in said selected color cache by setting the flag field in said new control block indicating that said current color list matches one or more color lists stored in said plurality of color caches, H3c) setting the type field in said new control block corresponding to the number of colors in said current color list, and H3d) outputting as part of said compressed data stream said control block and an index to said color list of said one or more color lists stored in said selected color cache; and H3e) outputting as part of said compressed data stream said current pixel map;

H4) if said current color list does not match one of said one or more color lists stored in said selected color cache, then encoding said current pixel block by H4a) generating a new control block, said new control block having a type field;

H4b) setting the type field of said new control block to a value corresponding to the number of colors in said current color list, H4c) outputting as part of said compressed data stream said new control block, said current color list and said current pixel map, and H4d) entering said current color list into said selected color cache.

2. The method as recited in claim 1 wherein said current pixel block includes pixels of one or more different colors, said step of generating a current color list being further comprised of the steps of:

a) determining whether a pixel color of a pixel in said current pixel block has not been previously encountered;

b) if said pixel color has not been previously encountered, adding said pixel color to said current color list;

c) if said pixel color has not been previously encountered, incrementing a color count, said color count providing a count of said one or more different colors in said current pixel block; and d) repeating steps a)–c) for all pixels in said current pixel block.

3. A method for compressing a block of color image data to create a compressed data stream comprised of encoded control blocks and color value data, said method comprising the steps of:

generating a control block having a type field, said control block being associated with a particular color list;

obtaining a current pixel block from said block of color image data, said current pixel block including a plurality of pixels having a plurality of colors;

generating a current color list corresponding to said current pixel block, said current color list identifying said plurality of colors;

generating a current pixel map, said current pixel map indicating a correspondence between said plurality of pixels and said plurality of colors;

providing a plurality of color caches for storing a plurality of color lists, wherein said plurality of color lists are stored in said plurality of color caches based upon the number of colors represented in each of said plurality of color lists;

comparing said current color list to said particular color list associated with said control block to determine a match; and if said current color list does not match said particular color list associated with said control block, then
identifying a selected color cache of said plurality of color caches, the selected color cache being a color cache that stored color lists that represent the same number of colors as are represented in said current color list;

comparing said current color list to one or more color lists from said selected color cache to determine if said current color list matches a color list of said one or more color lists stored in said selected color cache;

if said current color list does match said color list of said one or more color lists stored in said selected color cache, then encoding said current pixel block by creating a reference to said color list of said one or more color lists stored in said selected color cache, and outputting as part of said compressed data stream said current pixel map;

if said current color list does not match one of said one or more color lists stored in said selected color cache, then encoding said current pixel block by generating a new control block, said new control block having a type field;

setting the type field to said new control block to a value corresponding to the number of colors in said current color list, outputting as part of said compressed data stream said new control block, said current list and said current pixel map, and entering said current color list into said selected color cache;

wherein said step of comparing said current color list to one or more color lists from said selected color cache to determine if said current color list matches a color list of said one or more color lists stored in said selected color cache is further comprised of the steps of:

a) generating a cache entry mask for each entry in said selected color cache, each entry in said selected color cache representing one or more colors, each color of said one or more colors corresponding to a color range of a plurality of color ranges, said cache entry mask for each entry in said selected color cache identifying the color ranges of said plurality of color ranges that correspond to said one or more colors represented in said cache entry;

b) generating a pixel block mask, said pixel block mask identifying the color ranges of said plurality of color ranges that correspond to said plurality of colors of said plurality of pixels in said current pixel block;

c) comparing a cache entry mask of a selected cache entry in said selected color cache with said pixel block mask to determine if a predetermined minimum number of color ranges identified by the cache entry mask match the color ranges identified by the pixel block mask;

d) if said predetermined minimum number of color ranges identified by the cache entry mask do not match the color ranges identified by the pixel block mask repeating at step c) for a next cache entry;

e) if said predetermined minimum number of color ranges identified by the cache entry mask do match the color ranges identified by the pixel block mask comparing the individual colors of said current color list and said selected cache entry;

f) if a predetermined minimum number of colors identified in said cache entry do not match the colors identified in said current color list, repeating at step c) for a next cache entry;

g) If said predetermined minimum number of colors identified in said cache entry do match the colors identified in said current color list, identifying said cache entry as a match; and h) repeating steps c)–g) until a match is found or until steps c)–g) have been performed on all the cache entries in said selected cache.

* * * * *

UNITED STATES PATENT AND TRADEMARK OFFICE
CERTIFICATE OF CORRECTION

PATENT NO.    :  5,408,542
DATED         :  April 18, 1995
INVENTOR(S)   :  Sean M. Callahan It is certified that error appears in the above-identified patent and that said Letters Patent is hereby corrected as shown below:

In the Abstract at [57] in lines 2-3 delete "composed" and insert --comprised--

In column 4 at line 15 delete "decorepressed" and insert --decompressed--

In column 10 at line 17 delete "block mask" and insert --block mask.--

In column 11 at line 15 delete "hock" and insert --block--

In column 12 at line 46 delete "color" and insert --control--

In column 12 at lines 48-49 insert --control-- following "current" and prior to "block"

In column 14 at line 10 delete "stored" and insert --stores--

In column 14 at line 34 delete "$_{or}$" and insert --of--

In column 14 at line 38 insert --color-- following "current" and prior to "list"

In column 15 at line 4 delete "mask" and insert --mask,--

UNITED STATES PATENT AND TRADEMARK OFFICE
CERTIFICATE OF CORRECTION

PATENT NO. : 5,408,542
DATED : April 18, 1995
INVENTOR(S) : Sean M. Callahan

It is certified that error appears in the above-indentified patent and that said Letters Patent is hereby corrected as shown below:

In column 15 at line 9 delete "mask" and isnert --mask, --.

Signed and Sealed this

Nineteenth Day of November, 1996

Attest:

BRUCE LEHMAN

*Attesting Officer*    *Commissioner of Patents and Trademarks*